Aug. 19, 1969  F. V. BROSSEIT  3,461,769
ADJUSTABLE LENGTH SHOULDER SCREW
Filed March 6, 1968

INVENTOR
Fritz V. Brosseit
BY Scofield, Kokjer, Scofield & Lowe
ATTORNEYS

United States Patent Office 3,461,769
Patented Aug. 19, 1969

3,461,769
ADJUSTABLE LENGTH SHOULDER SCREW
Fritz V. Brosseit, S. 71 Bypass, R.R. 2, Box 286,
Lee's Summit, Mo. 64063
Filed Mar. 6, 1968, Ser. No. 710,807
Int. Cl. F16b 35/00, 35/04, 19/00
U.S. Cl. 85—1                                    6 Claims

ABSTRACT OF THE DISCLOSURE

An internally threaded sleeve-like body open at both ends and a headless screw are interconnected by screwing the screw into the sleeve with one end of the screw projecting from an end of and forming an extension from the sleeve. The sleeve body can be one-piece or two-piece construction and the screw is adjustable lengthwise within the pieces by twisting the components relative to one another to effect change in the length relationship. The selected relationship, and thus the overall length of the screw, can be releasably fixed by a releasable locking means which is readily accessible from one end of the assembly.

BRIEF DESCRIPTION OF THE INVENTION

The principal advantage of the present invention is that it provides a practical shoulder screw which is adjustable as to overall length. Because of the ready adjustability, the shoulder screw of my invention has a high degree of versatility in use and can be effectively substituted for existing shoulder screws in a wide number of applications with a resultant saving in time and labor in effecting certain operations where the length of the screw is a factor.

Screws made in accordance with the present invention can be used in all situations where shoulder screws are currently employed and where there is occasion to change the initial spacing established by the screw, either because of wear or for some other reason. The screw can be used in different machines and tools. One of its primary advantages in this type of use is that a screw according to my invention does not require the employment of shims to effect the adjustment. Particular features of the invention in this respect reside in the precision adjustment that is possible with my structure and that it is self securing and self aligning.

Shoulder screws according to my invention can also be used in situations where it is desired to apply a thrust force for effecting relative movement between or changing the force relationship between two components which are connected by one or more of the screws.

Shoulder screws according to my invention may be made in a wide variety of configurations and design for manipulation by many different tools, all without departing from the scope of the invention. They also may be fabricated from ferrous and non-ferrous metals and from plastic and other and more exotic materials with satisfactory operational results.

Other and further features and advantages of the invention, together with the features of novelty appurtenant thereto, will appear in the course of the following description.

DESCRIPTION OF THE DRAWING

In the accompanying drawing, which forms a part of the specification and in which like reference numerals indicate like parts in the various views.

Figure 1:
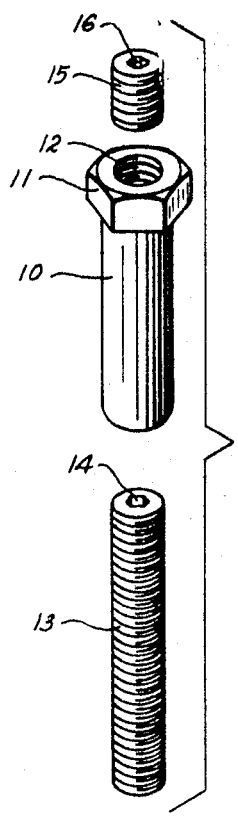
FIG. 1 is an exploded view of one form of the invention.
Figure 2:
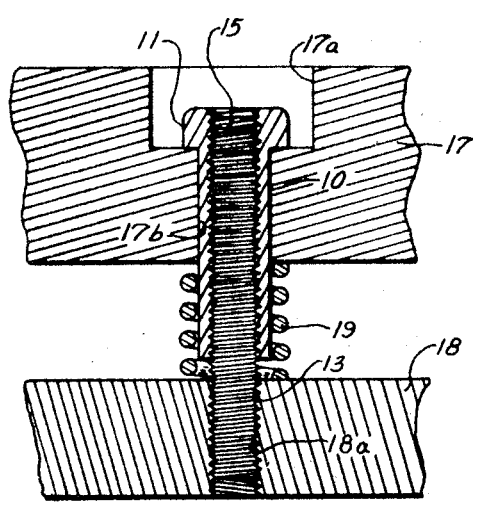
FIG. 2 is a fragmentary sectional view taken through a punch holder and stripper plate in which the stripper plate is connected to the punch holder by the form of the invention shown in FIG. 1.

Referring initially to FIGS. 1 and 2, reference numeral 10 indicates a generally cylindrical tubular shoulder screw body which is provided at its upper end with the hexagonal flanged head portion 11. The body 10 is provided with a central cylindrical threaded bore 12 which is open at both ends.

The body 10 is intended to be interconnected with an inner screw 13 having threads which cooperate with the threads in the bore 12 of the tube. The normal position of the screw within the bore 12 is illustrated generally in FIG. 2, with the upper end of the screw located some distance from the open upper end of the sleeve 10 and the lower end of the screw protruding from and forming an extension below the sleeve. In the illustrated embodiment, the upper end of the screw is provided with a tool socket 14 which may be in the form of an Allen head or the like. The socket 14 or other tool engaging means that may be provided is included so that the screw can be twisted within the body 10 working from the open upper end of the sleeve. Completing the assembly of FIG. 1 is a short screw 15 which is threaded like screw 13 and is provided with a tool socket 16 at its upper end. This screw is sometimes referred to herein as the set screw.

Referring more specifically to FIG. 2, I have here illustrated one particularly suitable application for a shoulder screw according to my invention. In this figure, reference numeral 17 indicates a portion of a typical punch holder. Reference numeral 18 indicates a portion of a stripper plate disposed below the punch head.

As is typical, the punch holder is provided with a bolt recess 17a which has centered in its lower surface a bore 17b to receive a shoulder screw. The stripper plate has a tapped bore 18a which is designed to receive the protruding lower end of the screw 13. The sleeve 10, is, of course, fitted through the bore 17b with the lower shoulder surface of the head portion 11 seated on the base of the recess 17a. A compression spring 19 serves to bias the stripper plate toward its extended position relative to the punch holder.

It will be noted that in FIG. 2, I have shown the lower end of the sleeve spaced from the stripper plate. Whenever it is necessary to draw the stripper plate more closely to the punch holder which is occasioned by the grinding of the punch, this can be effected simply by removing the set screw 15 and then applying the appropriate tool to the head 11 and turning it in a direction to draw the main screw 13 upwardly.

Alternatively, with a proper length sleeve, the sleeve end can be tightened down on the stripper plate at the outset. This arrangement may be employed where vibration is a problem. To reduce the spacing, the locking screw 15 is removed and the sleeve 10 backed off the screw. The sleeve is then shortened by the desired amount by grinding material off the end, and reconnected and drawn down tight on the stripper plate. The locking set screw 15 is reinserted and tightened against the end of the main screw to recomplete the connection.

Figure 3:
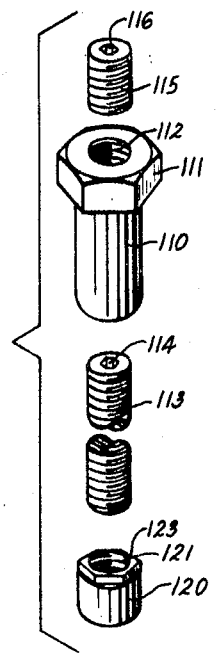
FIG. 3 is an exploded view of a modified form of the invention in which two sleeve parts are provided.
Figure 4:
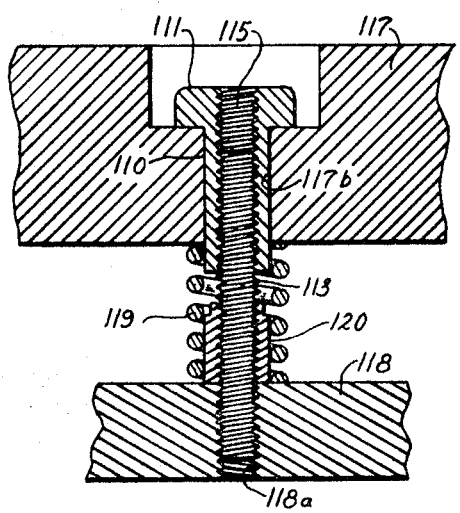
FIG. 4 is a fragmentary sectional view taken through a punch holder and a stripper plate similar to that of FIG. 2, but showing the components connected together by a form of the invention illustrated in FIG. 3.

Referring now to the embodiment of the invention shown in FIGS. 3 and 4, this embodiment includes the main sleeve 110, having the head 111 and threaded bore 112. The main inner screw is indicated at 113, this having the tool socket 114. A set screw 115 having tool socket 116 is also provided. In the embodiment of FIG. 3, the main sleeve 110 may be shorter than the sleeve of the prior embodiment. In addition, there is a second sleeve 120, which is internally threaded as at 121 to fit onto the screw 113. In addition, the supplementary or second sleeve 120 is provided with flaps or other tool engageable surfaces 123 to facilitate turning it on the screw.

Referring to FIG. 4 and using again the punch holder stripper plate combination as a means of illustrating a use for the invention, the punch holder 117 receives the upper sleeve 110 in an appropriate aperture 117b. As in the preceding embodiment, the inner screw 113 extends downwardly and is threaded into an appropriately tapped aperture 118a in the stripper plate 118. In this instance, the lower sleeve 120 is tightened down upon the upper surface of the stripper plate to prevent relative rotation of the screw and stripper plate. In order to change the spacing between the punch holder and stripper plate, one need only remove the set screw 115 (or loosen it) and then apply a tool to the head 111a of the upper sleeve and rotate it in a direction to draw the screw upwardly. When the proper spacing has been arrived at, the set screw can be reinserted and tightened down to fix the parts in the appropriate relationship.

In the past, whenever adjusting the spacing of a stripper plate relative to the punch holder, it has been necessary to completely remove the connecting shoulder screws and provide some sort of a shim or other spacer arrangement between the head of the screw and the punch holder. This operation can entail as much as two hours. Through the use of adjustable length shoulder screws according to my invention, it is possible to accomplish the same operation in the space of 15 minutes or at an obvious saving of one hour and 45 minutes. Complete removal of the screws and the introduction of shims is eliminated. In addition, it is possible to make a very sensitive adjustment limited to a few thousandths of an inch in the axial direction.

While I have illustrated the invention in connection with a punch, there are many other applications which will be evident. The screw can be used with any aligning operation. The screw can be locked in place and extended from a tapped plate or other support to provide a stub axle. In connection with the embodiment shown in FIGS. 3 and 4, the space between the upper and lower sleeves provides a lubricant reservoir where lubricants are necessary and where the screw is relied upon as a bearing surface. Various shapes of tool heads can be provided on the sleeves. For example, rather than a hex head the sleeves may be provided with round spanners or round slots or other desirable shapes. By the same token, the sleeve 120 may have a hex head as shown or diametrically opposed flats or any other conventional tool engageable surfaces or apertures through which rotation of the sleeve on the screw can be effected.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. An adjustable length shoulder screw for connecting two workpieces comprising a tubular sleeve open at both ends and including a central threaded bore, said sleeve having a flange-like tool engaging head at one end and an exterior smooth circumferential bearing surface along the entire length thereof, said sleeve longitudinally slidable into a bore through one of the workpieces, a screw within said sleeve bore having threaded engagement with the threads of said sleeve bore and adjustable longitudinally within said sleeve by relative rotation of said screw and sleeve about a common longitudinal axis, one end of said screw being spaced interiorly of said sleeve from said one end of said sleeve, the other end of said screw protruding from the other end of said sleeve with at least the free end thereof being threaded to its extremity so as to be threadable into a similarly threaded bore in the other workpiece, at least one end of said screw having tool receiving means thereon of a diameter less than that of the screw threads, and means for releasably and respectively locking said sleeve and screw and said screw and said second workpiece against relative rotation whereby to fix their longitudinal positions with respect to one another.

2. An adjustable length shoulder screw as in claim 1 wherein said means for releasably locking said sleeve and screw together includes a second screw threaded into said sleeve through said one end and having an inner end engageable with the confronting end of said first screw.

3. A shoulder screw as in claim 1, wherein the last named means includes a second tubular sleeve threaded onto the protruding end of said screw and adjustable lengthwise thereon.

4. A shoulder screw as in claim 3, said second tubular body having tool engageable surfaces on the exterior thereof.

5. A shoulder screw as in claim 1, said tool engaging head surface comprising a flange having tool engageable surfaces thereon.

6. A shoulder screw as in claim 1, said tool engaging head and said other end of said sleeve having parallel surfaces transverse to said longitudinal axis providing longitudinally spaced shoulders.

References Cited

UNITED STATES PATENTS

| | | | |
|---|---|---|---|
| 1,967,039 | 7/1934 | Mohr | 85—4 |
| 2,061,718 | 11/1936 | Stahl | 85—32 |
| 2,840,404 | 6/1958 | Weber | 85—32 |
| 3,267,519 | 8/1966 | Albert | 85—1 |
| 3,308,587 | 3/1967 | Gilroy et al. | |

FOREIGN PATENTS 1,062,091　3/1967　Great Britain.

RAMON S. BRITTS, Primary Examiner

U.S. Cl. X.R.

85—9; 287—189.36